2,932,627
Patented Apr. 12, 1960

2,932,627

COPOLYMER POLYMERCAPTAN RESIN

Frank P. Greenspan, Buffalo, and Rupert E. Light, Jr., Kenmore, N.Y., assignors to Food Machinery and Chemical Corporation, San Jose, Calif.

No Drawing. Application June 13, 1956
Serial No. 591,019

14 Claims. (Cl. 260—79.5)

This invention relates to compositions useful in the preparation of synthetic, thermoset resinous products and to these products, and particularly to thermoset castings, moldings, coatings, and the like derived from modified conjugated diene copolymers.

Because of their ready availability and their physical properties, the conjugated diene copolymers are potentially useful raw materials for the production of thermoset synthetic resinous products. These conjugated diene copolymers are the copolymers of conjugated dienes such as butadiene, the various substituted butadienes, for example isoprene, and the like with ethylene monomers containing the $CH_2=CH-$ group. Although it is possible to use these copolymers directly for making coatings, these coatings are not entirely satisfactory, usually showing lack of adhesion and lack of toughness. Particularly difficult is the production of useful castings from conjugated diene copolymers.

It has been found in accordance with the present invention that a conjugated diene copolymer can be modified by reaction with a lower aliphatic peracid to produce a stable, complex, thermoplastic reaction product having reactive epoxy and hydroxy groups and acyloxy groups, and subsequently converted to thermoset condition by reaction with a polymercaptan. The composition of the present invention, from which the thermoset resinous product is derived, comprises a mixture of the thermoplastic reaction product with a polymercaptan.

The composition and thermoset resinous product of this invention are prepared by a series of steps which will be more fully discussed individually hereinafter. In principle, a conjugated diene copolymer first is treated with a lower aliphatic peracid having 1 to 10 carbon atoms. The product of this reaction normally contains reactive epoxy and hydroxy groups and acyloxy groups. However, although it contains highly reactive functional groups, the reaction product is thermoplastic and can be stored for extended periods without losing this thermoplasticity. At some time following its preparation the thermoplastic reaction product is blended with a polymercaptan and the resulting mixture is employed in the production of thermoset resinous products. This last treatment is carried out under conditions which are directly suitable for the production of castings, coatings and the like. If it be desired to produce a casting, the reaction product resulting from treating a conjugated diene copolymer with a lower aliphatic peracid is mixed with a suitable polymercaptan and the mixture is poured into a mold. The mixture in the mold then is heated and thereby caused to set to a casting having properties ranging from rubbery to hard and tough, depending on the particular conjugated diene copolymer-lower aliphatic peracid reaction product and polymercaptan employed.

If it be desired to form a coating, the product obtained by treating a conjugated diene copolymer with a lower aliphatic peracid is mixed in solvent solution with a suitable polymercaptan and this solvent mixture then applied to the surface to be coated and the coating heated. Upon evaporation of the solvent and reaction of the residue, an adherent coating having properties ranging from rubbery to hard and tough, and determined by the choice of conjugated diene copolymer-lower aliphatic peracid reaction product and polymercaptan, is obtained.

Conjugated diene copolymers generally can be used as the raw material in the process of this invention. Copolymers of this type are formed from conjugated dienes such as butadiene, the various substituted butadienes, for example isoprene, and the like with ethylene monomers containing the $CH_2=CH-$ group. Small amounts of other unsaturated materials may be used in formation of the copolymer. Examples of suitable ethylene monomers are styrene, acrylonotrile, isobutylene, methylstyrene and vinyl chloride. Other conjugated dienes and ethylene monomers will suggest themselves to the chemist.

Production of useful conjugated diene copolymer-lower aliphatic peracid reaction products in the sense of this invention requires a starting material of a certain minimum chain length, i.e. degree of polymerization. No theoretical upper limit exists for the chain length of the unsaturated starting material to be oxidized in accordance with this invention. However, there are certain practical considerations which impose a limit on the degree of polymerization of the starting material. Because the reaction of the conjugated diene copolymer with a lower aliphatic peracid has to be carried out in the liquid phase, the starting material must either be a liquid or must be soluble in a suitable reaction medium. Many highly polymerized compounds are solids of little or no solubility in otherwise useful solvents and in this respect, a practical upper limit is imposed on the degree of polymerization of the starting material. In other words, the practical requirement imposed by the need of working in the liquid phase limits the choice of starting material. However, the degree of polymerization of the starting material will also have to be considered in connection with the properties desired in the reaction products. A highly polymerized starting material will produce a reaction product of somewhat different properties than would be obtained by the use of a starting material of a lower degree of polymerization.

The physical state of the conjugated diene copolymer is determined by its degree of polymerization and molecular weight. Any liquid or properly soluble conjugated diene copolymer may be used. Generally speaking, however, conjugated diene copolymers having the requisite solubility will have a molecular weight no higher than about 250,000. Preferably the molecular weight of the conjugated diene copolymer should be in the range of about 250 to 10,000.

The conjugated diene copolymer can be polymerized by any known method, for example emulsion, solution or bulk polymerization. However, it is preferred to employ a conjugated diene copolymer polymerized in solution in the presence of a catalytic amount of finely divided sodium. Conjugated diene copolymers having molecular weights in the preferred molecular weight range can be prepared readily by this method, and these products can be reproduced without difficulty.

The reaction of the conjugated diene copolymer is carried out in accordance with this invention by treating it with a lower aliphatic peracid. Suitable peracids are the aliphatic peracids having 1 to 10 carbon atoms. The reaction may be carried out using a preformed peracid or the peracid may be formed from its constituents during the reaction and in the reaction medium. In either case the reaction should be carried out under conditions favoring the protection of epoxy groups formed, for example in the case of the preformed peracid reaction, the reaction should be run at moderate temperatures, e.g. below about 75° C., and for only a few hours.

When reacting the conjugated diene copolymer with the lower aliphatic peracid, stoichiometric amounts of the peracid or amounts below that theoretically required completely to react with the double bonds present in the conjugated diene copolymer may be used. It is important, however, that the reaction product contain at least about 1% of oxirane oxygen in order that it will be highly reactive with the polymercaptan in forming thermoset products. In the following examples, conjugated diene copolymers treated with the stoichiometric amount of lower aliphatic peracid will be designated as "100% reacted," and their oxirane oxygen contents given. Conjugated diene copolymers reacted with reduced amounts of peracid will be designated by a percent figure to indicate what might be termed the degree of reaction in terms of the fraction of the theoretical amount of peracid used, and their oxirane oxygen contents likewise will be given. The reactivity and resin forming properties of the conjugated diene copolymer-lower aliphatic peracid reaction product will obviously vary with its degree of reaction with the lower aliphatic peracid, and with the amount of highly reactive oxirane oxygen which it contains. Generally speaking, a 100% reacted conjugated diene copolymer having a high oxirane oxygen content will be more reactive with the herein polymercaptans and will more readily form a casting or coating than will a conjugated diene copolymer reacted to a lesser extent. At the same time the properties of the finished casting or coating will also be influenced to an extent by the degree of the reaction of the conjugated diene copolymer.

As indicated above, the conjugated diene copolymer-lower aliphatic peracid reaction product is treated at some time subsequent to its preparation, with a polymercaptan. Suitable polymercaptans include the aliphatic dimercaptans pentamethylene dimercaptan, decamethylene dimercaptan and the like, as well as the polymeric polymercaptans, such as the reaction products of dihalides and sodium tetrasulfide which are dimercaptans containing terminal mercaptan groups. The polymeric polymercaptans are sold by the Thiokol Corporation of Trenton, New Jersey. The polymercaptans may contain other active hydrogen containing functional groups reactive with oxirane oxygen, and further may possess the ability to crosslink among themselves thereby augmenting the thermosetting reaction between the polymercaptan and the epoxy containing polymer.

Certain limitations on the choice of such polymercaptans are, however, imposed by the practical process requirements. If casting resins are to be produced, the conjugated diene copolymer reaction product has to be mixed with such polymercaptans before casting and heating. To permit proper mixing and use, the two main ingredients, the conjugated diene copolymer reaction product and the polymercaptan, should combine to give a liquid, pourable mixture at room or moderately elevated temperature. Therefore, in the case of casting resins, the polymercaptans should be those liquid at ordinary temperature, those which possess a relatively low melting point to permit mixing at room temperature or at moderately elevated temperature, or those which are soluble in the conjugated diene copolymer-lower aliphatic peracid reaction product. In the case of coating resins, a solvent is invariably used from which the coating is then obtained by evaporation. In this case the polymercaptans used are those soluble in the solvent from which the coating is to be made.

The amount of polymercaptan to be used for treating the conjugated diene copolymer-lower aliphatic peracid reaction product depends on the oxirane oxygen content of the conjugated diene copolymer-lower aliphatic peracid reaction product, the particular polymercaptan used, and the properties desired in the thermoset resinous product. The amount to be used is calculated on the basis of equivalent weights. In cases where full reaction is desired, one equivalent weight of the conjugated diene copolymer-lower aliphatic peracid reaction product, that is, the weight of reaction product containing 16 g. of oxirane oxygen, is treated with one equivalent weight of the polymercaptan. The equivalent weight of the polymercaptan is here defined as the molecular weight of the polymercaptan divided by the number of mercaptan groups contained in it. The amount of polymercaptan calculated in this way represents the theoretical amount for complete reaction. For example, if a sample of conjugated diene copolymer-lower aliphatic peracid reaction product is found by analysis to contain 6.6 g. of oxirane oxygen per 100 grams of the reaction product, its equivalent weight will then be $$\frac{100 \times 16}{6.6}$$

or 242 grams. If this porduct is to be treated with, e.g. nonamethylene dimercaptan, calculation shows that the equivalent weight of this polymercaptan is $$\frac{192}{2}$$

or 96 grams. The theoretical amount of nonamethylene dimercaptan to be used with this particular conjugated diene copolymer reaction product would then be $$\frac{96}{242}$$

or 0.400 gram of polymercaptan per gram of the reaction product.

In accordance with this invention, from 10 to 100% of the calculated theoretical amount of polymercaptan may be used in the production of the new casting or coating resins of this invention. The amount of reaction between any given conjugated diene copolymer-lower aliphatic peracid reaction product and the polymercaptan will determine largely its degree of solvent and heat resistances and hardness, and is dependent both on the amount of oxirane oxygen in the conjugated diene copolymer reaction product and the amount of polymercaptan used.

The following examples will illustrate in some detail the principle of this invention.

*Example 1*

25 g. of a liquid copolymer of 70 parts of butadiene and 30 parts of styrene was dissolved in 75 ml. of chloroform. To this solution was added, over a period of 20 minutes, 40.6 g. of perpelargonic acid. This amount of peracid corresponds to about 50% of the stoichiometric amount required fully to epoxidize the copolymer. During addition of the peracid the temperature was maintained at about 25° C., and following introduction of the peracid the temperature was raised to about 35° C., where it was maintained for one hour. The reaction batch then was washed free of acid over a water slurry of an anion exchange resin, dried over magnesium sulfate, and stripped of solvent under reduced pressure. The ion exchange resin employed was IRA 410, a weakly basic, amine type anion exchange resin and is produced by the Resinous Products Division, Rohm and Haas Company of Philadelphia, Pa. The product was analyzed and found to contain 6.59% of oxirane oxygen.

10. g. of the epoxidized copolymer prepared as described above was dissolved in 90 ml. of chloroform, and to this solution was added 3.2 g. of Thiokol ZC 119. This Thiokol product, a liquid polymeric dimercaptan, formed by reaction of ethylene dichloride with sodium disulfide, and is produced by the Thiokol Corporation of Trenton, New Jersey. This amount of the Thiokol corresponds to about the stoichiometric amount required for full reaction with the epoxidized copolymer. This solution was coated onto a glass plate, dried and baked for 2 hours at 150° C. The resulting film exhibited a high degree of toughness and hardness and was well-adherent to the glass plate.

Example 2

500 g. of a liquid copolymer consisting of 70 parts of butadiene and 30 parts of styrene was dissolved in 500 g. of toluene, and to this solution was added 120 g. of formic acid. 462 g. of 50% hydrogen peroxide was added to this solution over a period of 3 hours, during which time the solution was stirred and maintained at a temperature of about 45° C. Following introduction of the hydrogen peroxide, the temperature was raised to about 65° C. and maintained at this level for an additional 6 hours. The amount of hydrogen peroxide employed corresponds to a 10% excess over the amount required fully to epoxidize the copolymer. The reaction batch then was washed with water, dried over magnesium sulfate and stripped of solvent under reduced pressure. The product upon analysis was found to contain 7.92% of oxirane oxygen.

10 g. of the epoxidized copolymer prepared as described above was blended with 0.84 g. of pentamethylene dimercaptan, and the resulting mixture was poured into a small aluminum cup. This amount of dimercaptan corresponds to 25% of the amount required stoichiometrically for full reaction with the epoxidized copolymer. The mixture in the cup was baked for 2 hours at 150° C., following which the cup and its contents were cooled and the product was removed from the cup as a rubbery, tack-free casting.

Example 3

10.6 g. of a liquid copolymer of 70 parts of butadiene and 30 parts of styrene was dissolved in 60 g. of toluene. To this was added over a period of 10 minutes, 8 g. of 40% peracetic acid. This amount of peracid corresponds to about 30% of the stoichiometric amount required fully to epoxidize the copolymer. During addition of the peracid the temperature was maintained at about 25° C., and following introduction of the peracid the temperature was raised to about 50° C. and maintained at this level for an additional hour. The mixture then was washed free of acid with aqueous alkaline sodium chloride solutions, dried over magnesium sulfate, and stripped of solvent under reduced pressure. Upon analysis the product was found to contain 4.68% of oxirane oxygen.

10 g. of the epoxidized copolymer prepared as described above was dissolved in 90 ml. of toluene, and to this solution was added 2.8 g. of nonamethylene dimercaptan. This amount of dimercaptan corresponds to about 35% of the stoichiometric amount required for full reaction of the epoxidized copolymer. The solution was coated onto a glass slide, dried and the residue was baked for 2 hours at 150° C. The resulting film was found to be flexible, and exhibited a high degree of adhesion to the glass slide.

Example 4

25.8 g. of a rubbery 70–30 butadiene-styrene copolymer was dissolved in 26 g. of toluene containing an excess of sodium acetate. To this solution was added over a period of 20 minutes, 91 g. of 40% perbutyric acid. During addition of the peracid the temperature was maintained at about 35° C., and following introduction of the peracid this temperature was maintained for an additional 2¼ hours. The amount of peracid employed corresponds to about the stoichiometric amount required for full reaction with the copolymer. This reaction batch then was washed with a saturated sodium sulfate solution, and then with distilled water, following which it was dried over magnesium sulfate and stripped of residual solvent under reduced pressure. Upon analysis the product was found to contain 9.2% of oxirane oxygen.

10 g. of the epoxidized copolymer prepared as described above was dissolved in 90 ml. of toluene, and to this solution was added 3.0 g. of decamethylene dimercaptan. This amount of the dimercaptan corresponds to about 50% of the stoichiometric amount required for full reaction with the epoxidized copolymer. This solution was coated onto a glass slide, dried and baked at 150° C. for 2 hours. The resulting film was found to be flexible, moderately hard and exhibited good adhesion to the glass slide.

What is claimed is:

1. Thermoplastic, organic solvent soluble composition useful in the preparation of thermoset resinous products, said composition comprising (a) the reaction product of a copolymer of a conjugated diene hydrocarbon and an ethylenic monomer containing the $CH_2=CH-$ group, said copolymer having a molecular weight of 250 to 250,000, with a 1 to 10 carbon atom lower aliphatic peracid and containing at least 1% of oxirane oxygen on a molar basis in the form of three membered oxirane oxygen rings, and (b) a polymercaptan from the group consisting of aliphatic dimercaptans and the terminal dimercaptan reaction products of aliphatic dihalides and sodium tetrasulfide, said polymercaptan being present in an amount of at least 10% of the stoichiometric amount required for complete reaction with the oxirane oxygen in said reaction product to convert said thermoplastic composition to a thermoset resinous product.

2. Thermoplastic, organic solvent soluble composition useful in the preparation of thermoset resinous products, said composition comprising (a) the reaction product of a copolymer of a conjugated diene hydrocarbon and an ethylenic monomer containing the $CH_2=CH-$ group, said copolymer having a molecular weight of 250 to 250,000, with performic acid and containing at least 1% of oxirane oxygen on a molar basis in the form of three membered oxirane oxygen rings, and (b) a polymercaptan from the group consisting of aliphatic dimercaptans and the terminal dimercaptan reaction products of aliphatic dihalides and sodium tetrasulfide, said polymercaptan being present in an amount of at least 10% of the stoichiometric amount required for complete reaction with the oxirane oxygen in said reaction product to convert said thermoplastic composition to a thermoset resinous product.

3. Thermoplastic, organic solvent soluble composition useful in the preparation of thermoset resinous products, said composition comprising (a) the reaction porduct of a copolymer of a conjugated diene hydrocarbon and an ethylenic monomer containing the $CH_2=CH-$ group, said copolymer having a molecular weight of 250 to 250,000, with peracetic acid and containing at least 1% of oxirane oxygen on a molar basis in the form of three membered oxirane oxygen rings, and (b) a polymercaptan from the group consisting of aliphatic dimercaptans and the terminal dimercaptan reaction products of aliphatic dihalides and sodium tetrasulfide, said polymercaptan being present in an amount of at least 10% of the stoichiometric amount required for complete reaction with the oxirane oxygen in said reaction product to convert said thermoplastic composition to a thermoset resinous product.

4. Thermoplastic, organic solvent soluble composition useful in the preparation of thermoset resinous products, said composition comprising (a) the reaction product of a copolymer of a conjugated diene hydrocarbon and an ethylenic monomer containing the $CH_2=CH-$ group, said copolymer having a molecular weight of 250 to 250,000, with perpropionic acid and containing at least 1% of oxirane oxygen on a molar basis in the form of three membered oxirane oxygen rings, and (b) a polymercaptan from the group consisting of aliphatic dimercaptans and the terminal dimercaptan reaction products of aliphatic dihalides and sodium tetrasulfide, said polymercaptan being present in an amount of at least 10% of the stoichiometric amount required for complete reaction with the oxirane oxygen in said reaction product to convert said thermoplastic composition to a thermoset resinous product.

5. Thermoplastic, organic solvent soluble composition useful in the preparation of thermoset resinous products, said composition comprising (a) the reaction product of a copolymer of a conjugated diene hydrocarbon and an ethylenic monomer containing the $CH_2=CH-$ group, said copolymer having a molecular weight of 250 to 250,000, with perbutyric acid and containing at least 1% of oxirane oxygen on a molar basis in the form of three membered oxirane oxygen rings, and (b) a polymercaptan from the group consisting of aliphatic dimercaptans and the terminal dimercaptan reaction products of aliphatic dihalides and sodium tetrasulfide, said polymercaptan being present in an amount of at least 10% of the stoichiometric amount required for complete reaction with the oxirane oxygen in said reaction product to convert said thermoplastic composition to a thermoset resinous product.

6. Thermoplastic, organic solvent soluble composition useful in the preparation of thermoset resinous products, said composition comprising (a) the reaction product of a copolymer of a conjugated diene hydrocarbon and an ethylenic monomer containing the $CH_2=CH-$ group, said copolymer having a molecular weight of 250 to 250,000, with a 1 to 10 carbon atom lower aliphatic peracid and containing at least 1% of oxirane oxygen on a molar basis in the form of three membered oxirane oxygen rings, and (b) pentamethylene dimercaptan, said pentamethylene dimercaptan being present in an amount of at least 10% of the stoichiometric amount required for complete reaction with the oxirane oxygen in said reaction product to convert said thermoplastic composition to a thermoset resinous product.

7. Thermoplastic, organic solvent soluble composition useful in the preparation of thermoset resinous products, said composition comprising (a) the reaction product of a copolymer of a conjugated diene hydrocarbon and an ethylenic monomer containing the $CH_2=CH-$ group, said copolymer having a molecular weight of 250 to 250,000, and a 1 to 10 carbon atom lower aliphatic peracid and containing at least 1% of oxirane oxygen on a molar basis in the form of three membered oxirane oxygen rings, and (b) nonamethylene dimercaptan, said nonamethylene dimercaptan being present in an amount of at least 10% of the stoichiometric amount required for complete reaction with the oxirane oxygen in said reaction product to convert said thermoplastic composition to a thermoset resinous product.

8. Thermoplastic, organic solvent soluble composition useful in the preparation of thermoset resinous products, said composition comprising (a) the reaction product of a copolymer of a conjugated diene hydrocarbon and an ethylenic monomer containing the $CH_2=CH-$ group, said copolymer having a molecular weight of 250 to 250,000, with a 1 to 10 carbon atom lower aliphatic peracid and containing at least 1% of oxirane oxygen on a molar basis in the form of three membered oxirane oxygen rings, and (b) decamethylene dimercaptan, said decamethylene dimercaptan being present in an amount of at least 10% of the stoichiometric amount required for complete reaction with the oxirane oxygen in said reaction product to convert said thermoplastic composition to a thermoset resinous product.

9. Thermoplastic, organic solvent soluble composition useful in the preparation of thermoset resinous products, said composition comprising (a) the reaction product of a copolymer of a conjugated diene hydrocarbon and an ethylenic monomer containing the $CH_2=CH-$ group, said copolymer having a molecular weight of 250 to 250,000, with a 1 to 10 carbon atom lower aliphatic peracid and containing at least 1% of oxirane oxygen on a molar basis in the form of three membered oxirane oxygen rings, and (b) a terminal dimercaptan reaction product of an aliphatic dihalide and sodium tetrasulfide, said terminal dimercaptan being present in an amount of at least 10% of the stoichiometric amount required for complete reaction with the oxirane oxygen in said reaction product to convert said thermoplastic composition to a thermoset resinous product.

10. Thermoplastic, organic solvent soluble composition useful in the preparation of thermoset resinous products, said composition comprising (a) the reaction product of a copolymer of a conjugated diene hydrocarbon and an ethylenic monomer containing the $CH_2=CH-$ group, said copolymer having a molecular weight of 250 to 10,000, with a 1 to 10 carbon atom lower aliphatic peracid and containing at least 1% of oxirane oxygen on a molar basis in the form of three membered oxirane oxygen rings, and (b) a polymercaptan from the group consisting of aliphatic dimercaptans and the terminal dimercaptan reaction products of aliphatic dihalides and sodium tetrasulfide, said polymercaptan being present in an amount of at least 10% of the stoichiometric amount required for complete reaction with the oxirane oxygen in said reaction product to convert said thermoplastic composition to a thermoset resinous product.

11. Thermoset resinous product prepared from the composition of claim 2 by heating said composition until said thermoset resinous product has been produced.

12. Thermoset resinous product prepared from the composition of claim 10 by heating said composition until said thermoset resinous product has been produced.

13. Thermoplastic, organic solvent soluble composition useful in the preparation of thermoset resinous products, said composition comprising (a) the reaction product of a copolymer of a conjugated diene hydrocarbon and an ethylenic monomer containing the $CH_2=CH-$ group, said copolymer having a molecular weight of 250 to 250,000, and peracetic acid and containing at least 1% of oxirane oxygen on a molar basis in the form of three membered oxirane oxygen rings, and (b) nonamethylene dimercaptan, said nonamethylene dimercaptan being present in an amount of at least 10% of the stoichiometric amount required for complete reaction with the oxirane oxygen in said reaction product to convert said thermoplastic composition to a thermoset resinous product.

14. Thermoset resinous product prepared from the composition of claim 13 by heating said composition until said thermoset resinous product has been produced.

References Cited in the file of this patent

UNITED STATES PATENTS

| | | |
|---|---|---|
| 2,311,284 | Snyder | Feb. 16, 1943 |
| 2,381,266 | Drake | Aug. 7, 1945 |
| 2,660,563 | Banes | Nov. 24, 1953 |
| 2,789,958 | Fettes | Apr. 23, 1957 |

OTHER REFERENCES

Serniuk et al.: J. Am. Chem. Soc., 70, 1804–1808 (1948).